US011291058B2

(12) United States Patent
Denolle

(10) Patent No.: US 11,291,058 B2
(45) Date of Patent: Mar. 29, 2022

(54) INTERACTION BETWEEN A KIOSK AND A MOBILE USER EQUIPMENT

(71) Applicant: AKSOR, Saint-Thibault-des-Vignes (FR)

(72) Inventor: Thibaud Denolle, Saint-Thibault-des-Vignes (FR)

(73) Assignee: AKSOR, Saint-Thibault-des-Vignes (FR)

( * ) Notice: Subject to any disclaimer, the term of this patent is extended or adjusted under 35 U.S.C. 154(b) by 34 days.

(21) Appl. No.: 16/879,358

(22) Filed: May 20, 2020

(65) Prior Publication Data
US 2020/0374945 A1 Nov. 26, 2020

(30) Foreign Application Priority Data
May 24, 2019 (EP) .................................. 19305661

(51) Int. Cl.
| G01R 31/08 | (2020.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 76/10 | (2018.01) |
| H04B 17/318 | (2015.01) |
| G06Q 20/18 | (2012.01) |
| G06Q 30/02 | (2012.01) |
| H04W 12/71 | (2021.01) |

(52) U.S. Cl.
CPC ............ H04W 76/10 (2018.02); G06Q 20/18 (2013.01); G06Q 30/0237 (2013.01); H04B 17/318 (2015.01); *H04W 12/71* (2021.01)

(58) Field of Classification Search
CPC ....... H04W 76/10; H04W 12/71; H04W 4/00; H04W 88/02; H04W 99/00; H04B 17/318; G06Q 20/18; G06Q 30/0237; G06Q 50/12; G06Q 10/02; G06Q 30/0621; H04L 63/083; H04M 2201/60; H04M 2203/1058; H04M 2203/2016; H04M 3/4938
See application file for complete search history.

(56) References Cited

U.S. PATENT DOCUMENTS

| 10,044,988 B2 * | 8/2018 | Bulan .................. G06K 9/6254 |
| 10,068,272 B1 * | 9/2018 | Varma ................ G06Q 30/0635 |
| 2002/0178073 A1 * | 11/2002 | Gravelle ............ G06Q 30/0635 705/26.81 |
| 2004/0157637 A1 * | 8/2004 | Steer ...................... H01Q 25/00 455/525 |
| 2005/0137896 A1 * | 6/2005 | Pentecost ............ G07F 17/0014 705/321 |
| 2006/0217232 A1 * | 9/2006 | Kondrat ............. A63B 69/0028 482/3 |
| 2009/0287550 A1 * | 11/2009 | Jennings .......... G06Q 10/06398 705/7.42 |

(Continued)

Primary Examiner — Stephen M D Agosta
(74) Attorney, Agent, or Firm — Birch, Stewart, Kolasch & Birch, LLP

(57) ABSTRACT

A drive-thru system includes a kiosk equipped with at least one omnidirectional antenna and at least one directional antenna, and a user equipment equipped with a processing unit and a communication unit.

5 Claims, 3 Drawing Sheets

(56) References Cited

U.S. PATENT DOCUMENTS

| | | | | |
|---|---|---|---|---|
| 2010/0046439 A1* | 2/2010 | Chen | ............... | H04W 48/08 |
| | | | | 370/329 |
| 2011/0153457 A1* | 6/2011 | Hinks | ............... | G06Q 30/0635 |
| | | | | 705/26.81 |
| 2012/0058803 A1* | 3/2012 | Nicholson | ............ | H04M 1/605 |
| | | | | 455/570 |
| 2014/0267793 A1* | 9/2014 | Wang | ............... | G06K 9/3241 |
| | | | | 348/207.1 |
| 2015/0067880 A1* | 3/2015 | Ward | ............... | H04W 4/029 |
| | | | | 726/26 |
| 2015/0310615 A1* | 10/2015 | Bulan | ............... | G06K 9/6267 |
| | | | | 348/143 |
| 2016/0244311 A1* | 8/2016 | Burks | ............... | B67D 1/0858 |
| 2017/0024834 A1* | 1/2017 | Peterson | ............ | G06Q 20/203 |
| 2018/0048442 A1* | 2/2018 | Sang | ............... | H04B 7/088 |
| 2018/0376351 A1* | 12/2018 | Nagaraja | ............ | H04W 24/02 |
| 2019/0039463 A1* | 2/2019 | Moghe | ............... | B60L 53/12 |

* cited by examiner

INTERACTION BETWEEN A KIOSK AND A MOBILE USER EQUIPMENT

FIELD OF THE INVENTION

The present invention concerns systems and methods of determining the location of a user in an area. More particularly, but not exclusively, the invention concerns determining the location of a user in an area for enabling him to transmit data from a first device to a second device located in the area.

The present invention has applications in drive thru systems for enabling the use of digital coupons or user authentication using wireless communications.

BACKGROUND OF THE INVENTION

Drive-thru systems typically comprise an ordering kiosk equipped with an audio system for communication between the salesperson and the client and other devices like payment terminal or scanners for scanning bar or QR codes.

These scanners make it possible for the client to use coupons and benefit from commercial offers. However, under certain weather conditions, the scanner may become unusable. For example rain drops or sun rays may block the proper reading of the codes.

Another problem with drive-thru systems is that depending on the car used by the client, it may be more or less difficult to have access to the scanner. Depending on the car, the user may be more or less distant from the scanner. Sometimes, the user may have to step out of the car to have the code properly read by the scanner.

Thus, there is a need for improved drive-thru systems. The present invention lies within this context.

SUMMARY OF THE INVENTION

According to a first aspect of the invention, there is provided a drive-thru system comprising:
  a communication unit (607) for a kiosk (102), said communication unit being equipped with at least one omnidirectional antenna (104) and at least one directional antenna (106), and
  a user equipment (109, 50) equipped with a processing unit (52) and a second communication unit (53),
  wherein said user equipment is configured to:
  detect signals emitted by said omnidirectional antenna and initiate a communication with the communication unit using said at least one omnidirectional antenna,
  detect signals emitted by said at least one directional antenna, and
  depending on the signals detected, transmit data to kiosk through the communication unit using the communication initiated.

According to one embodiment, said user equipment is further configured to perform a measurement of power of the signals emitted by said at least one directional antenna and wherein said transmission of data is performed when said measured power is above a predetermined threshold. According to one embodiment, said signal from said at least one directional antenna comprises a value of said power.

According to one embodiment, said signal from said at least one directional antenna comprises an identifier of said kiosk.

According to one embodiment, the user equipment is further configured to receive a selection from a user of said data to be transmitted to the kiosk. According to one embodiment, the signals emitted by said directional antenna are detected upon receipt of said selection. According to one embodiment, said data are transmitted upon receipt of said selection.

According to one embodiment, said user equipment is further configured to:
  read identifiers from signals from omnidirectional antennas, and
  select signals comprising an identifier associated with said kiosk.

According to one embodiment, said kiosk comprises a graphical user interface (605) and a central processing unit (601), and wherein said data comprises an identifier of a user and said central processing unit is configured to display information associated with said user.

According to a second aspect of the invention, there is provided a method for exchanging data in a drive-thru system comprising:
  detecting, by a user equipment, signals emitted by an omnidirectional antenna of communication unit of a kiosk,
  initiating, by said user equipment, a communication with the communication unit using said at least one omnidirectional antenna,
  detecting, by said user equipment, signals emitted by said at least one directional antenna, and
  depending on the signals detected, transmitting, by said user equipment, data to the kiosk, through the communication unit, using the communication initiated.

According to one embodiment, the method further comprises performing, by said user equipment, a measurement of power of the signals emitted by said at least one directional antenna and wherein said transmission of data is performed when said measured power is above a predetermined threshold. According to one embodiment, said signal from said at least one directional antenna comprises a value of said power.

According to one embodiment, said signal from said at least one directional antenna comprises an identifier of said kiosk.

According to one embodiment, the method further comprises receiving, by said user equipment, a selection from a user of said data to be transmitted to the kiosk. According to one embodiment, the signals emitted by said directional antenna are detected upon receipt of said selection. According to one embodiment, said data are transmitted upon receipt of said selection.

According to one embodiment, the method further comprises:
  reading, by said user equipment, identifiers from signals from omnidirectional antennas, and
  selecting, by said user equipment, signals comprising an identifier associated with said kiosk.

According to one embodiment, said data comprises an identifier of a user, the method comprising displaying, by said kiosk information associated with said user on a graphical interface.

According to a third aspect of the invention, there is provided a communication unit (607) for a kiosk (102) of a drive-thru system comprising:
  at least one omnidirectional antenna (104) and at least one directional antenna (106), and
  a user equipment (109, 50) equipped with a processing unit (52) and a second communication unit (53),
  wherein said communication unit is configured to:
  emit signals by said omnidirectional antenna and initiate a communication with a user equipment, emit signals by said at least one directional antenna, and depending on the signals emitted, receive data from the user equipment be transmitted to the kiosk using the communication initiated.

BRIEF DESCRIPTION OF THE DRAWINGS

The invention will be more clearly understood from the following description, given by way of example only, with reference to the accompanying drawings, in which.

DETAILED DESCRIPTION OF THE INVENTION

In what follows, there is described a drive-thru system that uses wireless communications, like for example a Bluetooth® communication between an ordering kiosk and a user equipment, like for example a smartphone. These wireless communications are used instead of bar or QR codes. Thus, there is no need for the user to present a coupon he wants to use in front of a scanner outside his car. The coupon can be provided in a user equipment which can remain in the user's hands inside the car.

When several clients are lining up with their respective equipment with different coupons, the system is able to precisely select the equipment of the user which is just in front of the kiosk. Otherwise, it may happen that the coupon of a client behind the user in front of the kiosk is used. The problem may arise in particular in Dual Lane restaurants for example where two users may be attempting to authenticate or redeem a coupon offer at the same time.

Figure 1:
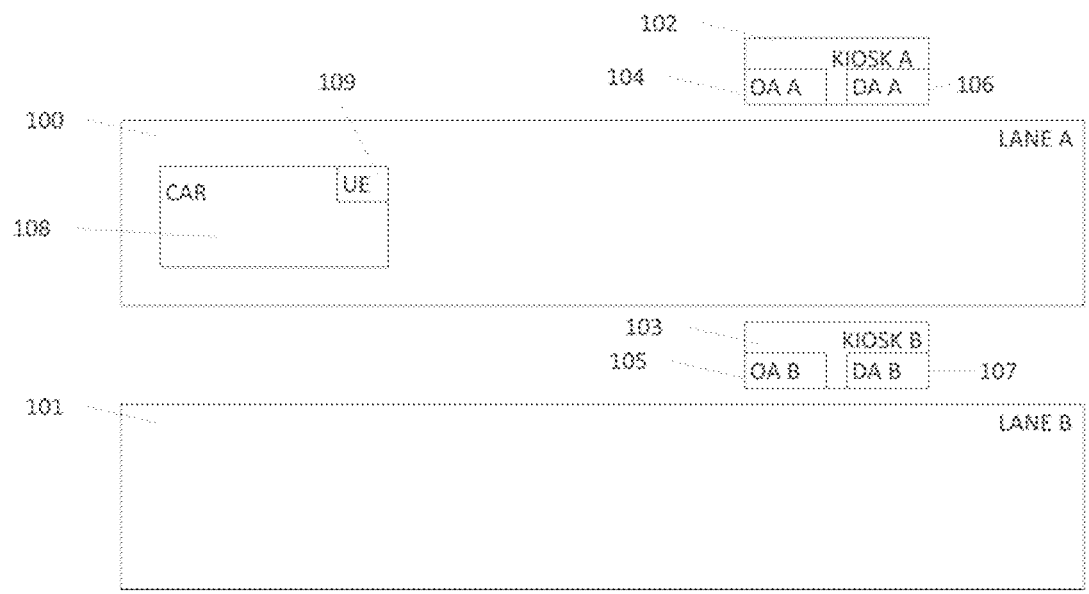
FIGS. 1-2 illustrate a context of implementation of embodiments.

FIG. 1 is a general context of implementation of embodiments of the invention.

A drive-thru restaurant has two lanes 100 (LANE A) and 101 (LANE B) and the restaurant is equipped with a drive-thru system with two kiosks 102 (KIOSK A) and 103 (KIOSK B) respectively associated with lanes 100 and 101. Each kiosk is equipped with an omnidirectional antenna 104 (OA A) and 105 (OA B). Each kiosk is also equipped with a directional antenna 106 (DA A) and 107 (DA B).

When a car 108 (CAR) enters lane 100, the user in the car launch an application on his user equipment 109 (UE, for example a smartphone). The user equipment, controlled by the application, then searches for a nearby omnidirectional antenna.

The car moves forward and the user equipment detects antenna 104. The user equipment then starts a communication with the kiosk and waits for the user to select a coupon to be used at the kiosk on the application. The communication includes a discovering process by scanning surrounding devices emitting signals, such as Bluetooth® signals and a filtering process for selecting the kiosk, using for example an identifier associated with it.

Figure 2:
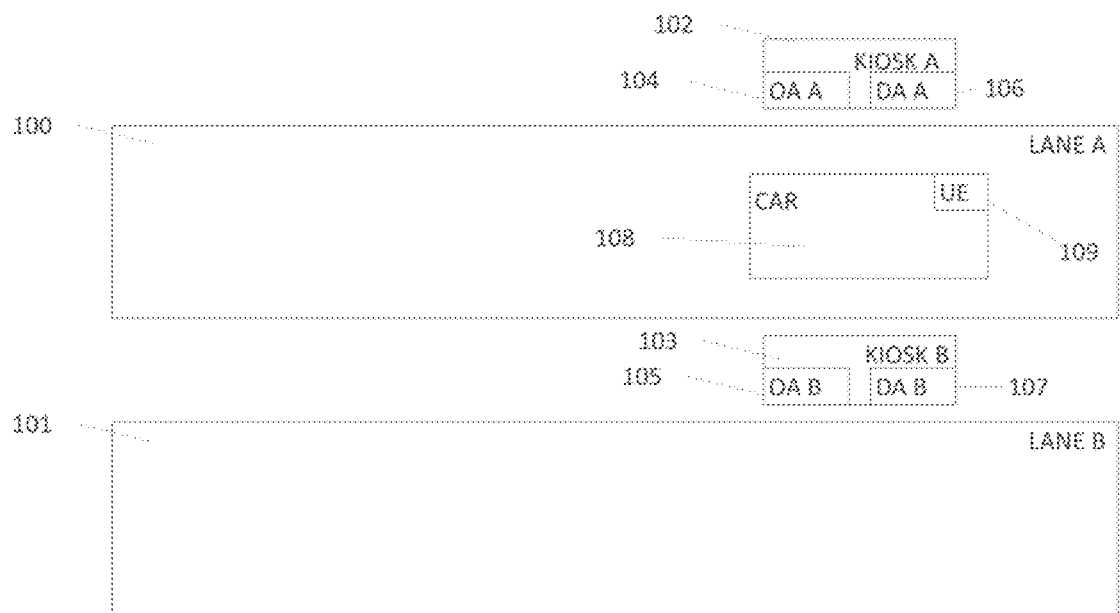

FIG. 2 illustrates the system when the car reached kiosk 102 (KIOSK A). If the user selects on the application of his user equipment a coupon to be used, the user equipment then detects the directional antenna 106 (DA A) and initiates a communication with the kiosk through it. For example, the communication comprises the reading of a message indicating a power value associated with the signals emitted by the kiosk. According to embodiments, the power value is emitted along with the identifier of the kiosk, in a same signal.

Depending on the strength of the signals from the directional antenna, the user equipment sends the coupon to the kiosk. Otherwise, the coupon is not sent. A threshold of the power level of the antenna signals is used to determine whether the user equipment is close enough to the kiosk to be sure that coupons from this user equipment can be used. This make is possible for example to discriminate between kiosks 102 and 103. In the position of the car in FIG. 2, the car is at the same distance from the two kiosks but since only antenna 106 is oriented towards the user equipment (and not antenna 107) and also since the user equipment detect enough power (i.e. it is at a sufficient distance from the antenna), only kiosk A can detect the user equipment as interacting with it. In case signals from antenna 107 are detected, their strength would be too low.

Figure 3:
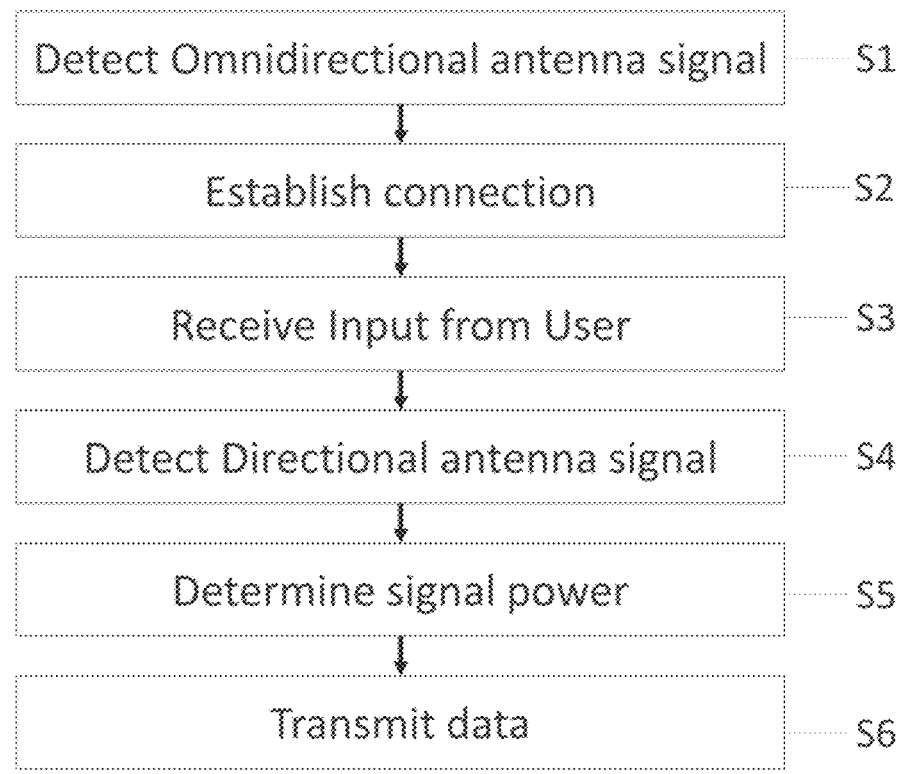
FIG. 3 illustrates steps of a method according to embodiments.

The above process is illustrated by the flowchart of FIG. 3. This flowchart illustrates the steps performed by the user equipment when the application is launched by the user. Step S1 is the detection step performed in order to start the process. The omnidirectional antenna of each kiosk periodically emits signals that the user equipment can detect. For example, the signals are emitted using the Bluetooth® protocol.

Once a signal from the omnidirectional antenna is detected, the user equipment establishes a connection through the antenna in step S2. For example, the user equipment sends a request to the omnidirectional antennas for opening a bi-directional communication channel in order to exchange information. The user equipment then waits for an input from the user, like for example a selection of data to be transmitted from the user equipment to the kiosk. According to embodiments, the data represents a coupon to be used and sent to the kiosk. According to other embodiments, the data may represent an identifier of a user which makes it possible for the kiosk to display offers or rewards on a screen. The data may also comprise identification date to start an identification process or the like. Once the input is received in step S3, the user equipment starts monitoring signals from a directional antenna. The directional antenna of each kiosk periodically emits signals that the user equipment can detect. For example, the signals are emitted using the Bluetooth® protocol. When the signal is detected in step S4, the user equipment determines is strength in step S5. If the power measured is above a predetermined threshold, then, in step S6, the user equipment sends the data using the bi-directional communication channel with the omnidirectional antenna.

In other implementations, step S3 may be performed after steps S4 and S5. This means that the user equipment does not wait for the user input to start searching for monitoring signals from the directional antenna. However, once communication is established with the kiosk through the directional antenna, the user equipment will wait for the user selection before sending the data.

Figure 4:
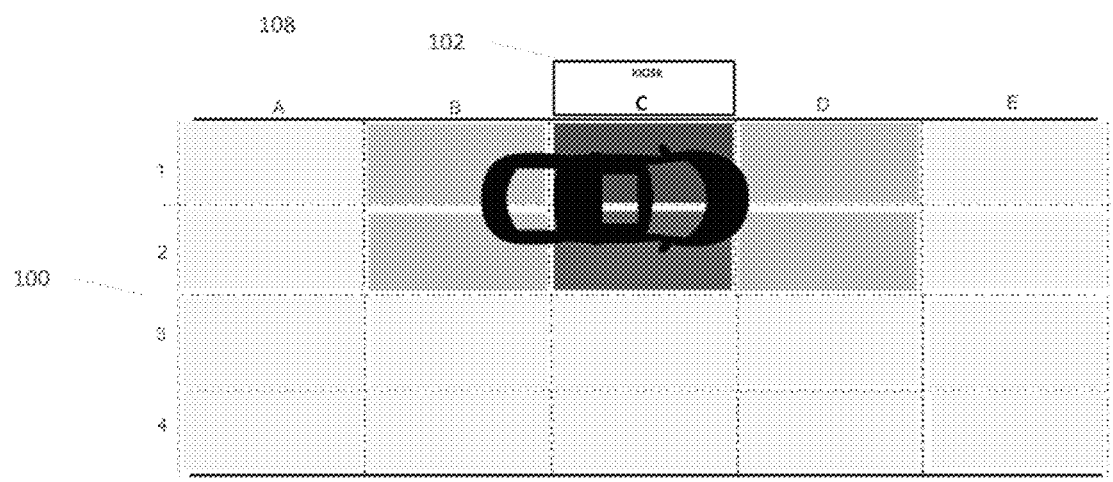
FIG. 4 illustrates the power of a signal of a directional antenna according to embodiments.

In order to better understand the reasons for measuring the power of the signals emitted by the directional antennas, FIG. 4 illustrates the power pattern around kiosk 102.

The area formed by lane 100 is divided into several sub-areas indicated by the lines 1, 2, 3, 4 and columns A, B, C, D. Kiosk 102 is situated just above line 1, at the level of column C.

Car 108 is positioned in front of kiosk 102. As illustrated in FIG. 4, directional antenna 106 does not emit its signals the same way in all directions. Areas (C;1) and (C;2) are the areas where the power strength is the highest. Areas (B;1), (B;2) and (D;1), (C;2) have medium strength. The other areas are where the power strength is the lowest.

As illustrated in FIG. 4, there is a very small area where the signals are strong. Thus, the risk of having a user equipment situates in the other lane communicate with kiosk 102 is eliminated.

Figure 5:
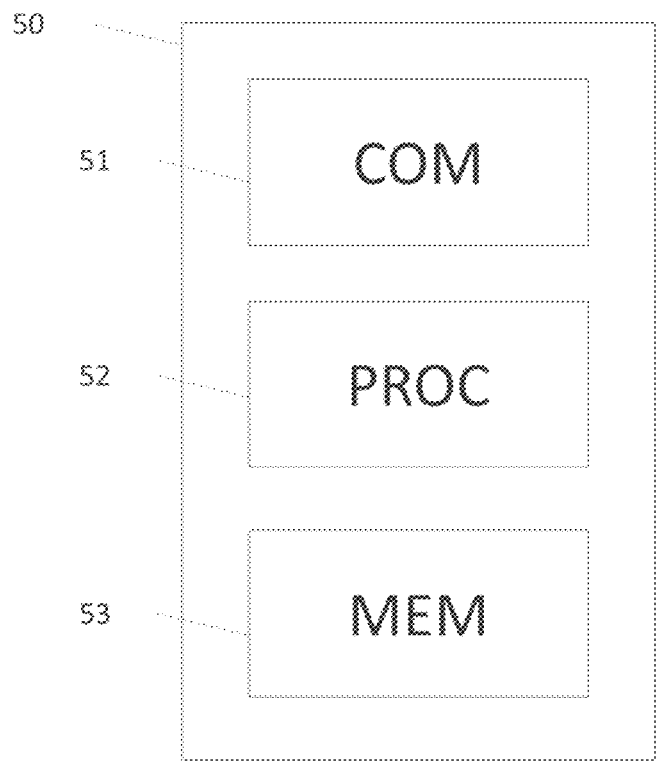
FIG. 5 illustrates a user equipment according to embodiments.

FIG. 5 shows a general structure of a user equipment according to embodiments. The user equipment may be, for example a smartphone or any other type of device with wireless communication capabilities and processing means for executing steps for performing a method as described above.

The user equipment 50 has a memory 53 for storing the executable code of the method of embodiments of the invention as well as the registers adapted to record variables and parameters necessary for implementing a method according to embodiments, the memory capacity thereof can be expanded by an optional RAM connected to an expansion port for example. The memory also comprises a read only memory for storing computer programs for implementing embodiments of the invention;

The programs (or applications) are executed by a central processing unit 52, such as a microprocessor.

The communications performed by the user equipment are controlled by a communication unit 51, itself controlled by the processing unit. The communication unit comprises one or more antenna in order to communicate with a kiosk through communication protocols like Bluetooth® for example. The communication unit also has measurement capabilities for measuring signal strength.

Of course, the user equipment may comprise other modules to perform other functionalities which are not described for the sake of conciseness.

Figure 6:
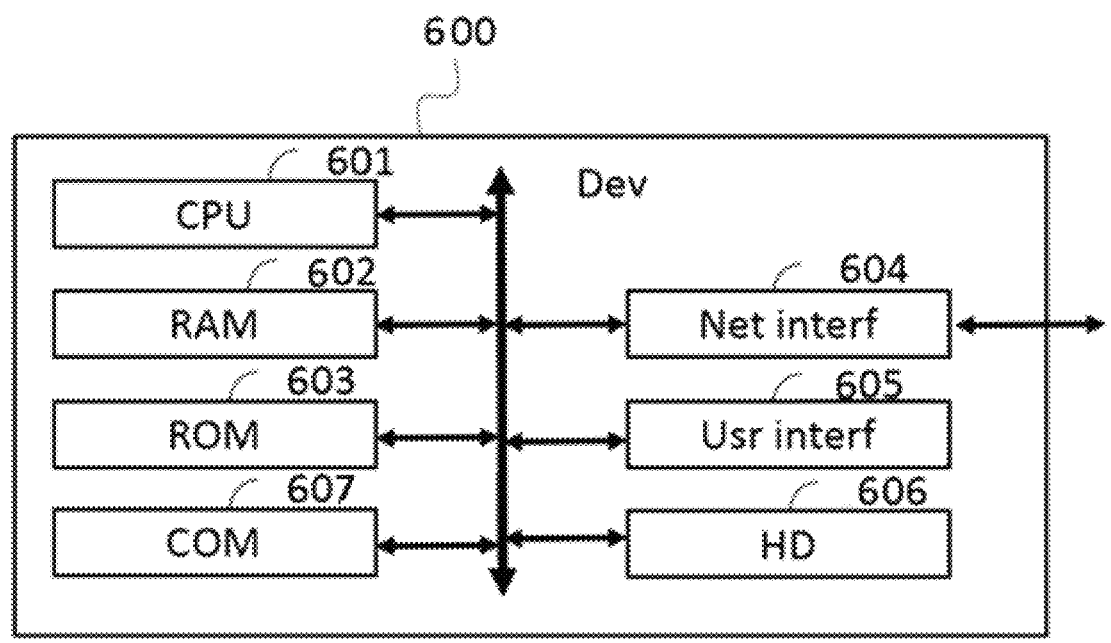
FIG. 6 illustrates a kiosk equipment according to embodiments.

FIG. 6 is a schematic block diagram of the general structure of a kiosk 600.

The device 600 comprises a communication bus connected to:
- a central processing unit 601, such as a microprocessor, denoted CPU;
- a random access memory 602, denoted RAM, for storing the executable code of the method of embodiments of the invention as well as the registers adapted to record variables and parameters necessary for implementing a method according to embodiments, the memory capacity thereof can be expanded by an optional RAM connected to an expansion port for example;
- a read only memory 603, denoted ROM, for storing computer programs for implementing embodiments of the invention;
- a network interface 604 is typically connected to a communication network over which digital data to be processed are transmitted or received. The network interface 604 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 601;
- a graphical user interface 605 for receiving inputs from a user or to display information to a user. The interface may comprise a touch screen, a microphone, a payment terminal or the like.
- a hard disk 606 denoted HD
- a communication module 607 for receiving/sending data from/to external devices. The module comprises for example antennas as described above.

The executable code may be stored either in read only memory 603, on the hard disk 606 or on a removable digital medium such as for example a disk. According to a variant, the executable code of the programs can be received by means of a communication network, via the network interface 604, in order to be stored in one of the storage means of the communication device 600, such as the hard disk 606, before being executed.

The central processing unit 601 is adapted to control and direct the execution of the instructions or portions of software code of the program or programs according to embodiments of the invention, which instructions are stored in one of the aforementioned storage means. After powering on, the CPU 601 is capable of executing instructions from main RAM memory 602 relating to a software application after those instructions have been loaded from the program ROM 603 or the hard-disc (HD) 606 for example. Such a software application, when executed by the CPU 601, causes the steps of a method according to embodiments to be performed.

For ease of understanding and illustrative purposes, the embodiments were described by referring mainly to the drawings. However, drawings should not be considered as restrictive but merely exemplary and illustrative. Various modifications can be made to the embodiments by those skilled in the art without departing from the scope of the disclosure as defined by the claims.

The invention claimed is:

1. A drive-thru system comprising:
   a communication unit for a kiosk, said communication unit being equipped with at least one omnidirectional antenna and at least one directional antenna, and
   a user equipment equipped with a processing unit and a second communication unit, wherein said user equipment is configured to:
   detect signals emitted by said omnidirectional antenna and initiate a communication with the communication unit using said at least one omnidirectional antenna,
   detect signals emitted by said at least one directional antenna, and
   depending on the signals detected, transmit data to kiosk through the communication unit using the communication initiated,
   wherein said user equipment is further configured to perform a measurement of power of the signals emitted by said at least one directional antenna and wherein said transmission of data is performed when said measured power is above a predetermined threshold, and wherein said signal from said at least one directional antenna comprises a value of said power,
   wherein said signal from said at least one directional antenna comprises an identifier of said kiosk,
   wherein the user equipment is further configured to receive a selection from a user of said data to be transmitted to the kiosk, and wherein the signals emitted by said directional antenna are detected upon receipt of said selection,
   wherein said data are transmitted upon receipt of said selection, wherein said user equipment is further configured to read identifiers from signals from omnidirectional antennas, and select signals comprising an identifier associated with said kiosk, and wherein said kiosk comprises a graphical user interface and a central processing unit, and wherein said data comprises an identifier of a user and said central processing unit is configured to display information associated with said user.

2. A method for exchanging data in a drive-thru system comprising:

detecting, by a user equipment, signals emitted by an omnidirectional antenna of communication unit of a kiosk, initiating, by said user equipment, a communication with the communication unit using said at least one omnidirectional antenna, detecting, by said user equipment, signals emitted by said at least one directional antenna, depending on the signals detected, transmitting, by said user equipment, data to the kiosk, through the communication unit, using the communication initiated, performing by said user equipment, a measurement of power of the signals emitted by said at least one directional antenna and wherein said transmission of data is performed when said measured power is above a predetermined threshold, wherein said signal from said at least one directional antenna comprises an identifier of said kiosk, receiving, by said user equipment, a selection from a user of said data to be transmitted to the kiosk, wherein the signals emitted by said directional antenna are detected upon receipt of said selection, and wherein said data are transmitted upon receipt of said selection, and reading, by said user equipment, identifiers from signals from omnidirectional antennas, and selecting by said user equipment, signals comprising an identifier associated with said kiosk, wherein said kiosk comprises a graphical user interface and a central processing unit, and wherein said data comprises an identifier of a user and said central processing unit is configured to display information associated with said user.

3. The method according to claim 2, wherein said signal from said at least one directional antenna comprises a value of said power.

4. The method according to claim 2, wherein said data comprises an identifier of a user, the method comprising displaying, by said kiosk information associated with said user on a graphical interface.

5. A communication unit for a kiosk of a drive-thru system comprising:

at least one omnidirectional antenna and at least one directional antenna, and a user equipment equipped with a processing unit and a second communication unit, wherein said communication unit is configured to:

emit signals by said omnidirectional antenna and initiate a communication with a user equipment, emit signals by said at least one directional antenna, and depending on the signals emitted, receive data from the user equipment be transmitted to the kiosk using the communication initiated, wherein said user equipment is further configured to perform a measurement of power of the signals emitted by said at least one directional antenna and wherein the receipt of data is performed when said measured power is above a predetermined threshold, and wherein said signal from said at least one directional antenna comprises a value of said power, wherein said signal from said at least one directional antenna corn Rises an identifier o said kiosk, wherein the user equipment is further configured to receive a selection from a user of said data to be transmitted to the kiosk, and wherein the signals emitted by said directional antenna are detected upon receipt of said selection, wherein said data are received upon receipt of said selection, wherein said user equipment is further configured to read identifiers from signals from omnidirectional antennas, and select signals comprising an identifier associated with said kiosk, and wherein said kiosk comprises a graphical user interface and a central processing unit, and wherein said data comprises an identifier of a user and said central processing unit is configured to display information associated with said user.

* * * * *